United States Patent [19]
Leyten et al.

[11] Patent Number: 5,625,883
[45] Date of Patent: Apr. 29, 1997

[54] SYSTEM FOR WIRELESS INFORMATION TRANSMISSION BETWEEN TWO DIFFERENT ROOMS

[75] Inventors: Lukas Leyten; Mario J. De Bijl, both of Eindhoven, Netherlands

[73] Assignee: U.S. Philips Corporation, New York, N.Y.

[21] Appl. No.: 661,835

[22] Filed: Jun. 11, 1996

Related U.S. Application Data

[63] Continuation of Ser. No. 359,366, Dec. 20, 1994, abandoned.

[30] Foreign Application Priority Data

Dec. 24, 1993 [BE] Belgium ................. 09301460

[51] Int. Cl.$^6$ ................................ H04B 5/02
[52] U.S. Cl. ................ 455/41; 336/232; 379/55
[58] Field of Search .............. 455/40, 41, 42, 455/345; 381/79; 336/232, DIG. 2; 379/55, 56

[56] References Cited

U.S. PATENT DOCUMENTS

| | | | |
|---|---|---|---|
| 4,654,880 | 3/1987 | Sontag | 455/41 |
| 4,763,340 | 8/1988 | Yoneda et al. | 375/257 |
| 4,818,855 | 4/1989 | Mongeon et al. | 235/440 |
| 4,985,922 | 1/1991 | Kolbert | 381/79 |
| 4,999,597 | 3/1991 | Gaynor | 336/232 |
| 5,161,255 | 11/1992 | Tsuchiya | 455/345 |
| 5,241,410 | 8/1993 | Streck et al. | 455/40 |

FOREIGN PATENT DOCUMENTS

| | | | |
|---|---|---|---|
| 0032981 | 8/1981 | European Pat. Off. . | |
| 0007430 | 1/1991 | Japan | 455/41 |
| 2202414 | 9/1988 | United Kingdom | 455/41 |

Primary Examiner—Andrew Faile
Assistant Examiner—Lee Nguyen
Attorney, Agent, or Firm—Edward W. Goodman

[57] ABSTRACT

For audio and/or video or control signal transmission between two rooms in, for example, a house, inductive and/or capacitive transmitters and receivers are used which are installed on opposite sides of the partition or wall that separates the rooms. The signals to be transmitted may be applied or tapped from the transmitter/receiver by cables or by infrared transceiving diodes. The transmitter and receiver consist of, for example, two metal plates or two coils installed substantially opposite each other on opposing sides of the wall.

6 Claims, 2 Drawing Sheets

SYSTEM FOR WIRELESS INFORMATION TRANSMISSION BETWEEN TWO DIFFERENT ROOMS

This is a continuation of application Ser. No. 08/359,366, filed Dec. 20, 1994 abandoned.

BACKGROUND OF THE INVENTION

1. Field of the Invention

The invention relates to a system for transmitting information between two different rooms, comprising signal transmitting means installed in one room and signal receiving means installed in the other room.

Wireless information transmission is increasingly used in houses; one may think in this respect of wireless telephones, remote control for audio and video equipment, wireless headphones, baby phones and so on.

2. Description of the Related Art

A characterizing feature for all these known systems is the use of radio waves, infrared light or ultrasonic sound for transmitting information. A large drawback to the use of infrared light and ultrasonic sound is that such signals cannot simply be sent from one room to another if the two rooms are separated by partitions or walls, as is the case with the rooms in a house. Partitions or walls do not pass an intensely high signal frequency, for example 60 GHz, either, which frequency may be utilized for signal transmission in the near future. Radio waves do not have this drawback, but the use thereof brings along other objections. For example, the transmitted radio waves may cause interference to other equipment in the house, but also outside the house and, in the case of confidential information, coding must be used to avoid third parties outside the house tapping the information; a radio connection is sensitive to external sources of interference such as the ignition of engines and, finally, there is an extensive regulation with respect to the use of various radio frequencies and there is little or no possibility of having new frequencies assigned to new applications.

SUMMARY OF THE INVENTION

It is an object of the invention to provide a system with which it is possible to transmit information between pieces of equipment installed in two rooms separated by a partition or wall, without the need for modulating the information on radio waves.

Therefore, the invention provides a system of said type, characterized in that coupling means are provided for effecting inductive and capacitive coupling between the two rooms for unmodulated signal transmission, which coupling means are located substantially opposite each other on opposite sides of a partition or wall that separates the two rooms, and in that further means are coupled to said coupling means to apply information thereto and/or tap information therefrom.

According to a first embodiment, the coupling means for effecting an essentially capacitive coupling consist of two metal surfaces such as metal plates mounted on opposite sides of the partition or wall. According to another embodiment, the coupling means for effecting essentially inductive coupling consist of two coils placed on either one of the two sides of the partition or wall and, according to yet another embodiment, the coupling means for effecting simultaneously both inductive and capacitive coupling consist of two flat coils placed against opposite sides of the partition or wall and consisting each of a helical strip of metal mounted flat against the partition or wall. In this connection there is observed, however, that there is always both capacitive and inductive coupling which depends on the specific configuration of the coils or the capacitor strips on opposite sides of the partition or wall and either the capacitive behavior or the inductive behavior may dominate because of a specific configuration.

As the electromagnetic fields providing the signal transmission in the system according to the invention occur only very locally, this system does not cause interference to other apparatus in the neighborhood and neither is it very sensitive to interference caused by other apparatus. Neither is it possible to receive the transmitted information at some distance from the transmitting means, for example, outside the house, so that no coding is necessary. Finally, no specific frequency band needs to be assigned.

It is possible to transmit, for example, audio signals in the 20-20,000 kHz range with the system according to the invention utilizing inductive coupling as required, when a frequency equalization network is used, because the degree of coupling between the coils depends on frequency. In addition to frequency equalization, impedance matching networks may also be included to "show" the source a constant impedance and to supply the coil with a frequency-dependent impedance. If a frequency equalization network is used, it is even possible, in essence, to transmit video signals having a bandwidth of 5 MHz. Even digital signals can be transmitted.

The capacitive and inductive transmitting means may be driven in various ways. The same holds for tapping information from these transmitting means in the room where "reception" takes place. For example, the transmitted signal can be applied directly from the loudspeaker output of an audio amplifier through the cable to the capacitive and inductive transmitting means or be tapped therefrom. Another option is the use of infrared diodes when the diode in one room receives the transmitted information in the form of infrared signals from, for example, audio equipment, from a video recorder or from a telephone set; this signal is then converted to a normal audio, video or telephone signal and transmitted capacitively or inductively to the other room where the transmitted signal is reconverted in a manner known per se to an infrared signal transmitted to the receiving means by the infrared diode in that room. For the power supply to the infrared diodes and the transmitting means for capacitive and/or inductive signal transmission and for the power supply to the further components, as required, necessary for signal transmission and/or equalization, a power supply source in the form of (rechargeable) batteries or a line voltage supply should be provided. The system according to the invention may then be arranged on opposite sides of the wall as a box the size of a wall socket and having a similar shape, so that also visually an attractive combination is obtained.

In the manner described above, audio equipment such as a CD player, a cassette deck, a tuner and so on, can be set up in one room along with an amplifier and loudspeakers, whereas in the other room, only an amplifier and, in the case of infrared transmission, receiving means for receiving the transmitted signal such as an infrared receiver, and loudspeakers need to be present. Similarly, a video recorder can be used in a room to transmit signals to a television set in the same room, but also to a television set(s) in another room or in other rooms.

With the system according to the invention, it is possible to transmit not only audio or video signals in both analog and digital form, but it is also possible to transmit control signals in addition thereto or with the exclusion thereof, so that it is possible to control the equipment in a second room while being in a first room, such as controlling a video recorder, a CD player and so on. Similarly, it may be advantageous to install in both rooms supply means for supplying signals to the capacitive and/or inductive transmitting means and install tapping means for tapping signals therefrom. With the measures according to the invention, it is thus possible to realize in a simple manner and at low cost a so-called multi-room system in which the information inside a room is transmitted preferably by infrared signals and from one room to the next, by the capacitive and inductive transmitting means.

BRIEF DESCRIPTION OF THE DRAWING

With the above and additional objects and advantages in mind as will hereinafter appear, the subject invention will be described with reference to the accompanying drawing, in which.

DESCRIPTION OF THE PREFERRED EMBODIMENT

Figure 1A:
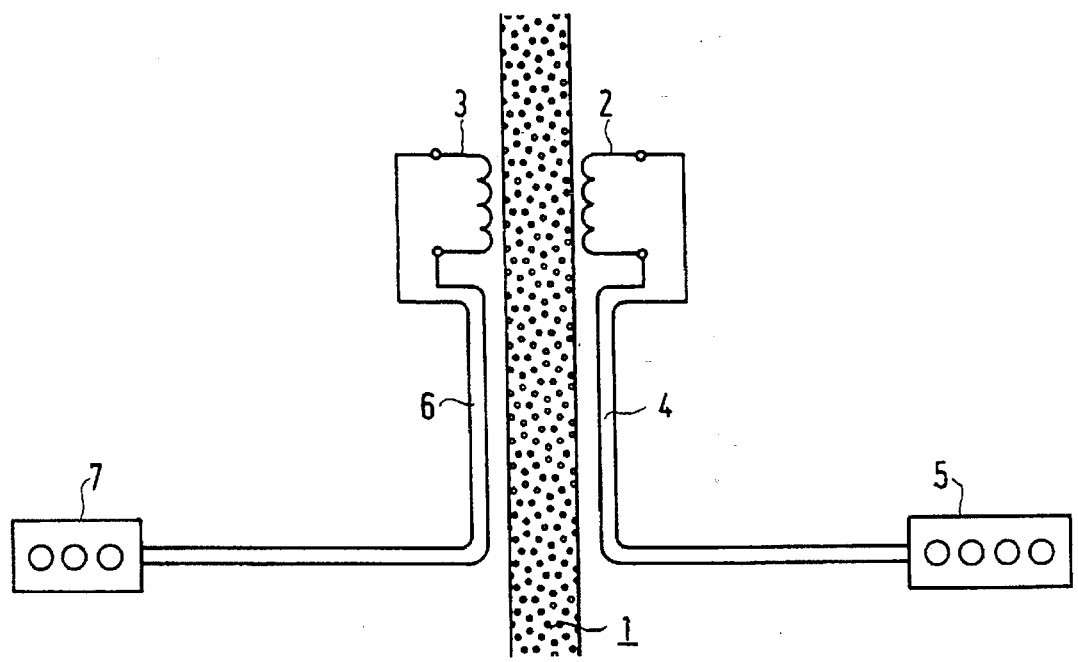
FIG. 1a shows a coupling between two amplifiers on opposite sides of a wall.
Figure 1B:
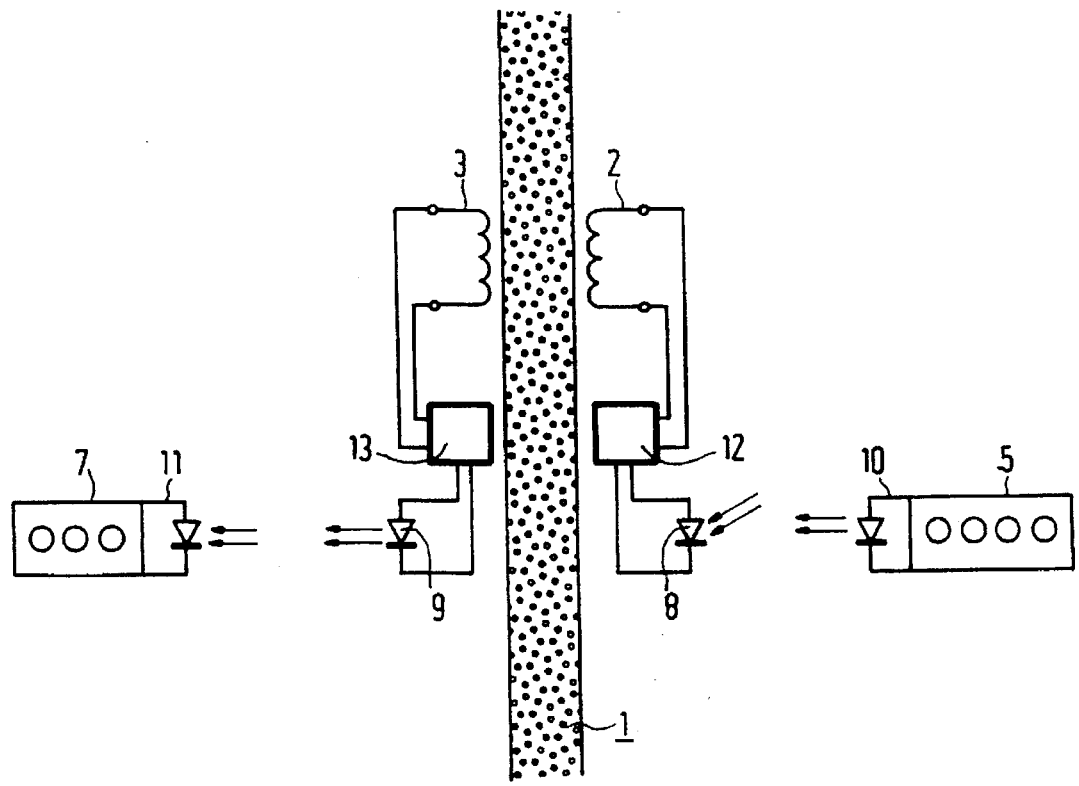
FIG. 1b shows the coupling of FIG. 1a between an infrared transmitter and receiver.

FIG. 1a shows an embodiment for the system according to the invention in which a coil 2 and a coil 3 respectively, is installed on either side of a wall 1. The coil 2 is connected via a cable 4 to the output of an audio amplifier 5 and the coil 3 is connected via a cable 6 to an input of an audio amplifier 7. Similarly, as is shown in FIG. 1b, the cables 4 and 6 may be replaced by an infrared receiving diode 8 and an infrared transmitting diode 9 respectively, the amplifier 5 containing an infrared transmitting diode 10 for transmitting the audio signal, and the amplifier 7 containing an infrared receiving diode 11 for receiving the audio signal. Furthermore, means 12 known per se are included to amplify and/or further process the infrared signal received by diode 8 and means 13 are included to amplify and/or further process the signal to be applied to the diode 9. The further processing by the means 12 and 13 had better come from equalization and/or impedance transformation of the signals.

Figure 2A:
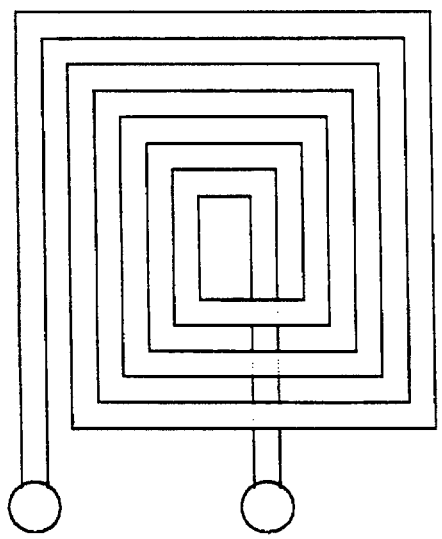
FIGS. 2a and 2b show embodiments of each of the couplings as a flat coil in the form of a helical strip of metal.
Figure 2B:
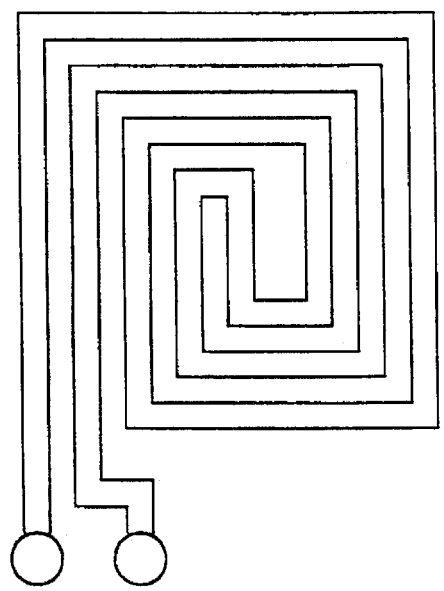

FIGS. 2a and 2b show preferred embodiments of the coils 2 and 3. In particular, each of the coils consists of a flat strip of metal shaped to form a helical coil. These coils may then be mounted in registration with one another to the opposing surfaces of the wall by, for example, an adhesive coating (not shown).

It will be evident that within the scope of the invention many modifications both as regards configuration and application of the described system are possible.

We claim:

1. System for transmitting information between two different rooms, comprising signal transmitting means installed in one room and signal receiving means installed in the other room, characterized in that said system further comprises:

a single coupling means for effecting simultaneously both inductive and capacitive coupling between the two rooms for unmodulated signal transmission of an information signal, said coupling means having a first part located in said one room and a second part located in said other room, said first and second parts being located substantially opposite each other on opposing sides of a partition or wall that separates the two rooms;

first means for connecting said signal transmitting means to said first part of said coupling means thereby enabling applying said information from said signal transmitting means to said first part of said coupling means; and second means for connecting said second part of said coupling means to said signal receiving means thereby enabling tapping said information from said second part of said coupling means to said signal receiving means.

2. System for transmitting information as claimed in claim 1, characterized in that the first and second parts of said coupling means respectively comprise a portion for effecting essentially capacitive coupling, said portions consisting of two metal plates mounted on said opposing sides of the partition or wall.

3. System for transmitting information as claimed in claim 1, characterized in that the first and second parts of said coupling means respectively comprise a portion for effecting essentially inductive coupling, said portions consisting of two coils placed on said opposing sides of the partition or wall.

4. System as claimed in claim 1, characterized in that the first and second parts of said coupling means for effecting simultaneously both inductive and capacitive coupling consist of two flat coils placed against said opposing sides of the partition or wall, said flat coils each comprising a helical strip of metal mounted flat against the partition or wall.

5. System as claimed in claim 1, characterized in that said first and second means for connecting comprise respective cables connecting said first and second parts of said coupling means to said signal transmitting means and said signal receiving means, respectively, for receiving the information to be transmitted and for relaying the transmitted information, respectively.

6. System as claimed in claim 1, characterized in that the first and second means for connecting comprise respective infrared transceiver means connecting said first and second parts of said coupling means to said signal transmitting means and said signal receiving means, respectively, for receiving the information to be transmitted and for relaying the transmitted information, respectively.

* * * * *